June 9, 1936.  G. H. ROEDER  2,043,265
PROCESS OF AND APPARATUS FOR TREATING DECOMPOSABLE ORGANIC MATTER
Filed Feb. 12, 1932  4 Sheets-Sheet 1

George H. Roeder INVENTOR

BY Paul R. Ames ATTORNEY

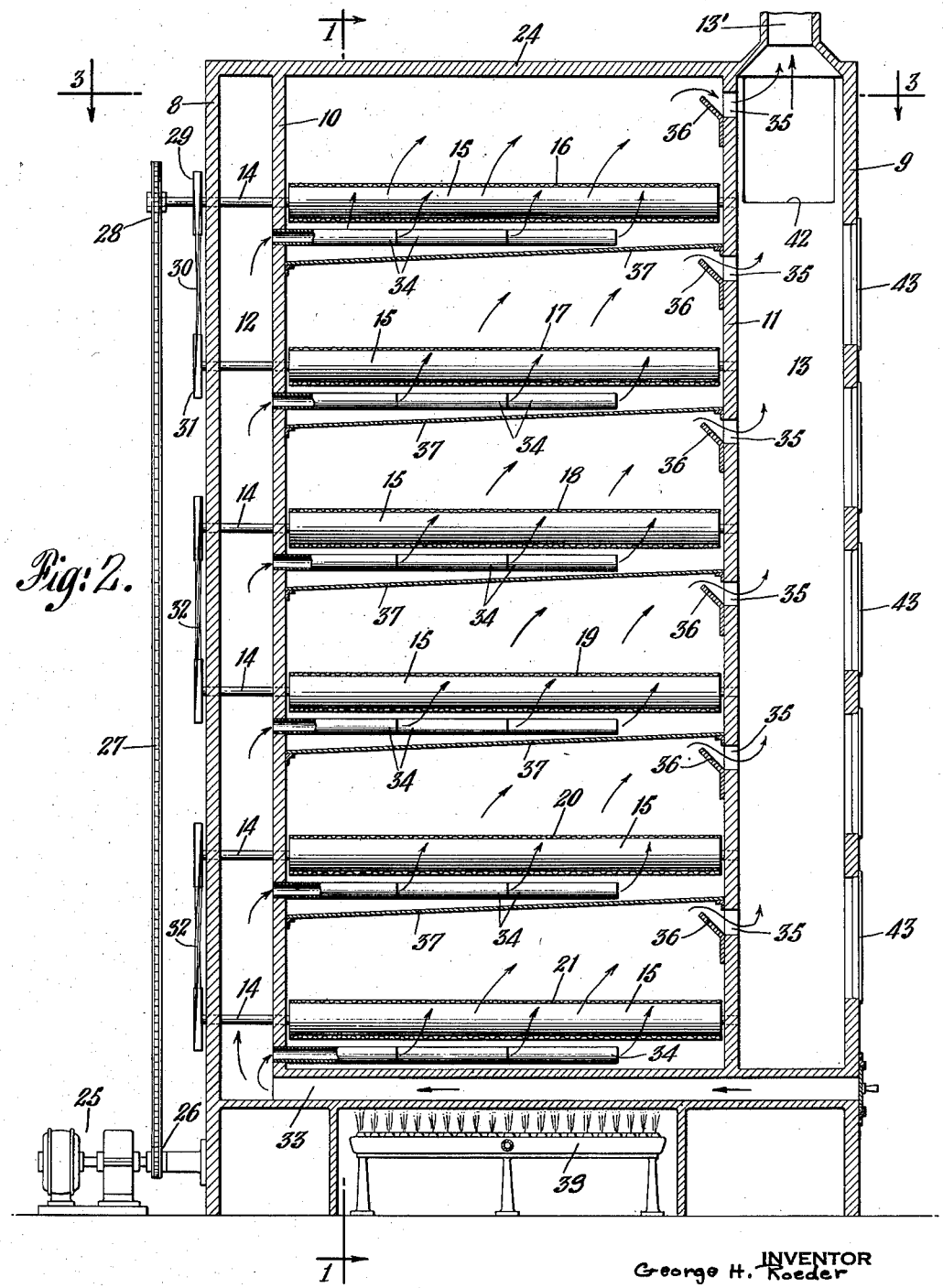

June 9, 1936.　　　G. H. ROEDER　　　2,043,265
PROCESS OF AND APPARATUS FOR TREATING DECOMPOSABLE ORGANIC MATTER
Filed Feb. 12, 1932　　4 Sheets-Sheet 3
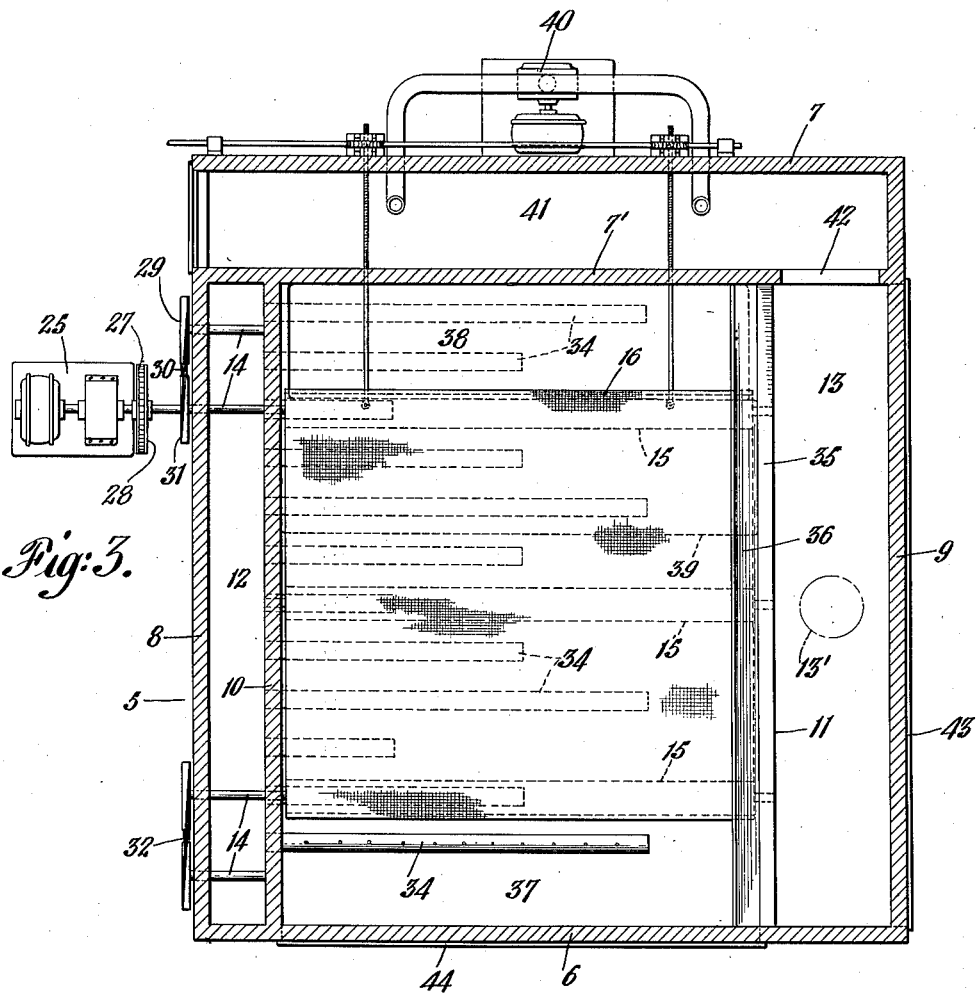
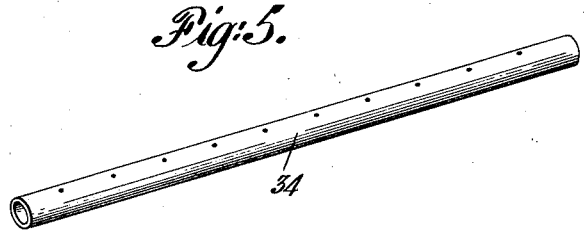
INVENTOR
George H. Roeder
BY
Paul R. Ames
ATTORNEY

Patented June 9, 1936

2,043,265

UNITED STATES PATENT OFFICE

2,043,265

PROCESS OF AND APPARATUS FOR TREATING DECOMPOSABLE ORGANIC MATTER

George H. Roeder, Brooklyn, N. Y., assignor to Bio Reduction Corporation of New York, Brooklyn, N. Y., a corporation of New York Application February 12, 1932, Serial No. 592,510

16 Claims. (Cl. 71—10)

This invention relates to the stabilization and/or decomposition of organic material, such as sewage and garbage, and also to the conversion of such material into fertilizer. While the factors which enter into the decomposition of organic material are varied and complicated, and not well understood, it is known that sewage and garbage do decompose, but only over extended periods of time and with coincident formation of putrid, foul-smelling substances. Moreover, exposed decomposing material ordinarily furnishes a breeding place for pathogenic bacteria.

Numerous proposals have been made and more than a few plants constructed with a view to disposing of sewage by treating the same to produce a sludge which can be employed as a fertilizer, but such processes, besides taking a long time and involving the use of expensive apparatus, produce sludges which are still subject to considerable putrefaction, and which in that condition are not only valueless but must be got rid of at additional expense, for instance, by placing them in shallow trenches. This latter step requires extensive land which must not be near habitations. Garbage, so far as we are aware, has never been decomposed reasonably rapidly save by incineration.

The principal object of the present invention is to provide an improved process for stabilizing and/or decomposing such material in a simple, rapid and effective manner, while avoiding objectionable putrescence and inhibiting the growth of harmful pathogenic organisms, and as an incident of the process to produce a material which is especially adapted for use as a fertilizer. Another object is to provide novel and advantageous apparatus for carrying out this process. Other objects and advantages of the invention will become apparent as the description proceeds.

I have devised, for treating organic materials, such as sewage, a novel process having a number of marked advantages among which are the reduction of putrefaction to a negligible amount, an extremely rapid completion of the desired reaction, and the formation of a useful product instead of a nuisance. I have further found that the process is capable of decomposing garbage. Moreover, I have provided a simple and efficient apparatus for carrying out my process.

According to this invention organic material of the character mentioned may be rapidly decomposed by inoculating it with oxidizing aerobic and/or facultative aerobic bacteria, capable of causing decomposition of the material, and by aerating the inoculated mass while engendering in it a porous condition, and providing for carrying out the reaction at a relatively elevated temperature. More particularly, I have found that by inoculating such material with abundant, high-bred or virile bacteria of this character, preferably including thermophilic types in addition to organic nitrogen, cellulose and protein decomposing, and sulphur oxidizing bacteria, and treating the mass, preferably initially in a moist, spadable condition, in the manner indicated, the same may be converted rapidly to a state in which the material is stabilized and/or decomposed to the desired extent, while putrefaction is reduced to a point where it is practically negligible, and the growth of disease germs is forestalled. Moreover, by continuing the process I am able to prepare a material which, besides being in the desired state of stabilization or decomposition, is reduced to a finely divided condition, so that by virtue not only of its chemical and biological constitution, but also of its physical condition, is a good material for use as a fertilizer. That is to say, the present process is capable of accomplishing rapid conversion of organic material to the desired stable or decomposed condition, in which it is capable of being maintained, and in which it is advantageous for fertilizing purposes, all in a simple and expeditious manner, and with the evolution of but negligible, if any, undesirable putrid odors ordinarily essential in the decomposition of such material.

In describing a preferred embodiment of the invention in detail, reference will first be had to the accompanying drawings, illustrating one form of machine for carrying out my process, and wherein:

Fig. 2 is a vertical section through the construction shown in Fig. 1, and taken on the lines 2—2 of Fig. 1, looking in the direction of the arrows.

Fig. 3 is a sectional view of the construction shown in Figs. 1 and 2. taken on line 3—3 of Fig. 2.

Fig. 5 is a perspective, detail view of a tube for conveying air to the material.

Figure 1:
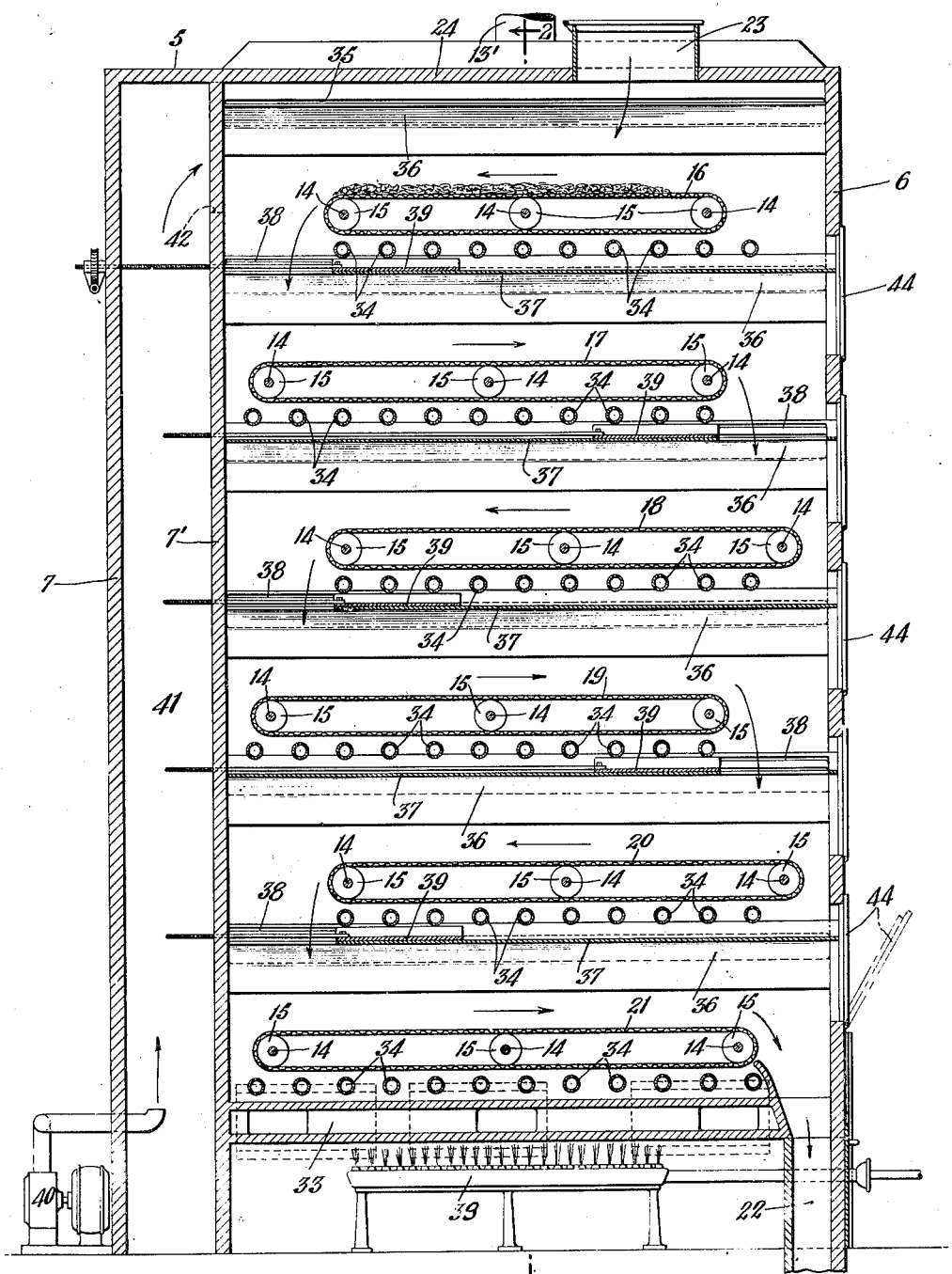
Fig. 1 is a vertical section through such a machine, taken on the line I—I of Fig. 2, looking in the direction of the arrows.
Figure 4:
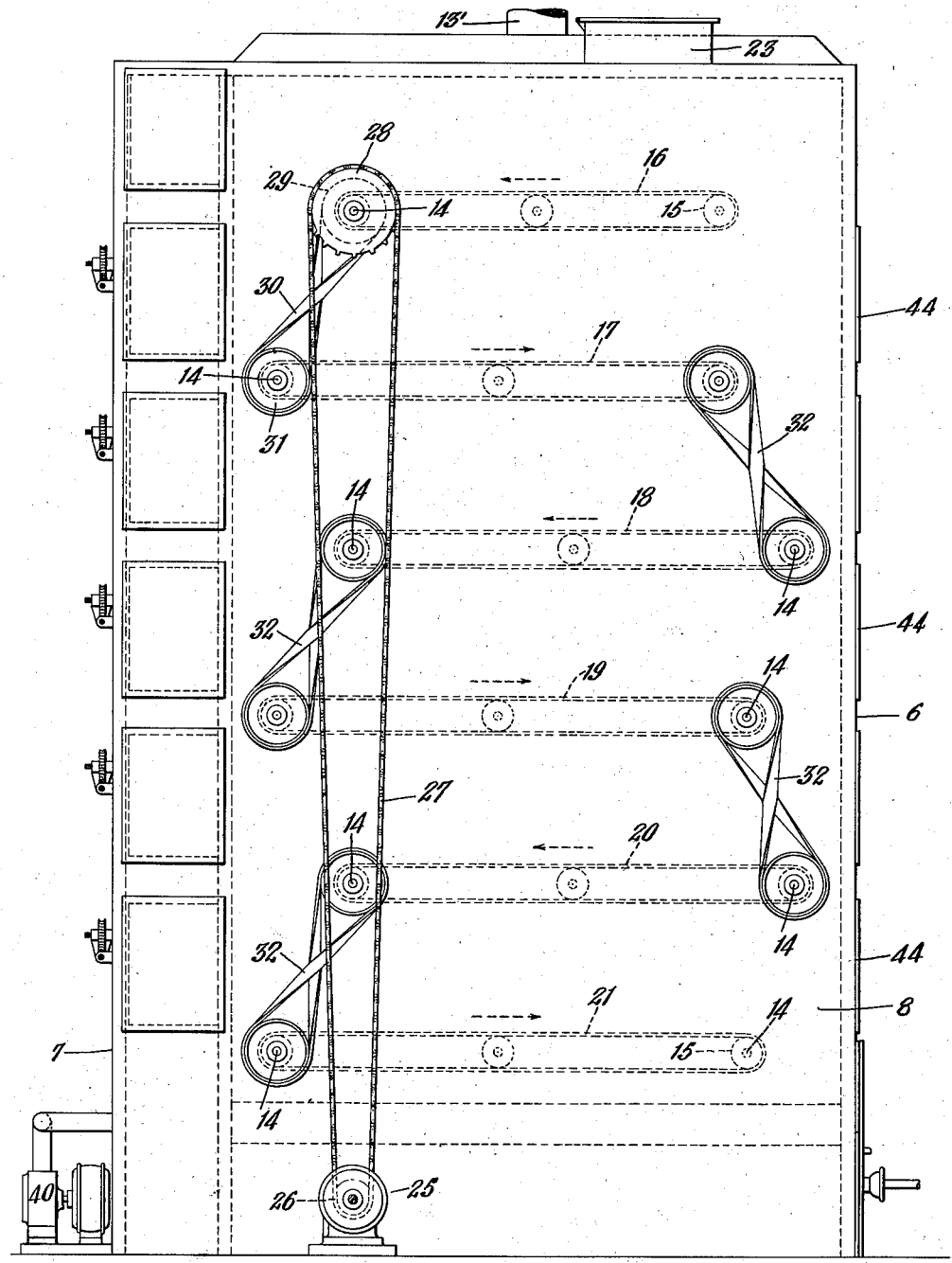
Fig. 4 is an elevation, looking toward the left hand side of the construction with respect to Fig. 1.

Referring to the drawings, there is shown at 5 a housing having front and rear walls 6 and 7, respectively, and side walls 8 and 9. Between the walls 8 and 9 there are interposed spaced walls 10 and 11 to form passages 12 and 13 for purposes hereafter described. Exhaust stack 13' is shown at the top of passage 13. A plurality of shafts 14 are shown extending through walls 8 and 10 and supported at one end therein, their other ends being supported in wall 11. These shafts are shown as having rollers 15 secured thereto, and extending substantially across the space between walls 10 and 11. A plurality of foraminous endless-belt type screens 16, 17, 18, 19, 20 and 21, may be provided carried by the rollers 15 for traveling thereover. The size of the openings or mesh in the foraminous screens vary and may be of desired size for supporting the material to be decomposed and for the proper passage of air, for instance, about No. 16 mesh or greater, and the screen may be formed of any suitable material such as wire mesh. If desired, the size of mesh employed may be larger for upper screens than for the lower ones. The screens are adapted to travel over the rollers 15 when one or more of the shafts for each screen is rotated. As shown, in Fig. 1, the screens are preferably positioned so that they are staggered horizontally, the ends of alternate screens being relatively close to the walls 6 and 7, and the screens being spaced vertically from one another at a convenient distance. In this manner, material may first be placed on the screen 16 and supported thereon, being evenly distributed thereover. When each screen is caused to travel, it will dump the material on the screen below. For instance, the material on screen 16 will be dropped little by little, onto the left hand end of screen 17 (Fig. 2), and screen 17 which is traveling in the opposite direction will support the material, also evenly distributed, while carrying toward the right the various portions of the material as they fall from screen 16. Similarly, the material may be passed from screen 17 to screen 18 and so on. It may be advantageous to cause all the screens to travel together, after a given quantity of material has remained on each screen for a desired period of time, or to have caused them to travel in pairs or otherwise. In starting the apparatus, there will be material only on the screen 16, but as the operations proceed, all the screens will finally become covered with material and thereafter remain so, for as material is discharged from screen 21 through outlet conduit 22, to a suitable bin or container, additional material may be placed upon the screen 16 through a trap door 23 in roof 24 of the housing. Any suitable device such as a bucket elevator or screw conveyor may be employed, if desired, to feed the material through the trap door 23.

In order to effect travel of the screens 16—21, any suitable means such as a motor 25 or other mechanical means, sprocket wheel 26 and chain 27 may be provided. This chain may drive through sprocket 28, shaft 14 for screen 16, and through pulley 29, belt 30, and pulley 31, the shaft 14 for screen 17. If desired, other shafts 14 may also be driven through the same chain 27 and other belts 32, as shown in a similar manner. The motor 25 may be controlled through convenient mechanism not shown, for periodic operation of the screens.

While the material is maintained in a porous condition, on the various screens 16 to 21, it is desirable to pass air, preferably upward, through the material on the screens, and for this purpose there is shown a conduit 33 leading to passage 12.

From the passage 12 a series of pipes 34, provided with openings in their upper sides, as well as at their free ends, extend through wall 10 and beneath the various screens. These pipes may extend outwardly any desired distance, and their number and length may be varied. Any suitable fan or blower may be employed for forcing air through passage 33, passage 12 and pipes 34. Openings 35 are shown provided in the wall 11 so that the air which has passed through the screens and the material thereon may exhaust through passage 13 and opening 14 in the top of the apparatus. Baffles 36 may be provided if desired, adjacent the openings 35.

Partitions or trays 37 are preferably provided extending beneath the several screens 16—20, thus forming compartments in which the screens are located. In this manner, water which may drip from the material on the screens is caught on the partitions and may be carried off through suitable means not shown. Besides preventing water from dripping from one batch of material onto the next, these partitions provide for preventing air in a given compartment from passing into the other compartments. That is to say, a stream of fresh air may thus be provided for each batch of material in each compartment.

Door frames 38, provided with sliding doors operable in any convenient manner may be embodied in the partitions, to provide openings through which material may be dropped from one screen to the next, the doors being preferably closed at other times. Water pipes (not shown) may be provided beneath the screens for adjusting the temperature in the apparatus, and any convenient heating device 39 may be employed for raising the temperature of the air to be passed through the material.

Spaced from the rear wall of the housing 7 there is shown a wall 7' which forms the rear wall of the compartments in which the screens are located. If desired, an ozone generator 40 may feed ozone into the passage 41 between walls 7 and 7', the ozone being adapted to enter passage 13 through opening 42 at the top thereof, for neutralizing such slight gases as may escape into passage 13. However, the use of ozone may be omitted entirely save where even extremely slight odors are objectionable. Suitable doors 43 and 44 may be employed where desired to provide access to the interior of the apparatus for cleaning the same or making repairs. The doors 44 may also serve to admit additional air to the chamber or passage 13.

The housing 5 may be constructed of any desired material such as brick, reinforced concrete, metal, or wood and the dimensions of the same will, of course, depend principally upon the amount of material to be handled.

In treating material with the aid of bacteria in accordance with the present process, it is highly desirable that a porous condition be engendered in the material. The material during initial stages of the process will generally contain considerable quantities of water, and may be in the form of a mush which has a tendency to become thick or pasty and non-porous. I have found that such a mass may advantageously be reduced to a porous condition, so that air may reach all parts of it, by breaking it up from time to time. More particularly, good results may be secured by causing the material to react, while its moisture content is reduced, and then dropping the material bit by bit so that it is broken up. Preferably, this succession of steps is repeated a number of times, with the highly desirable result that the portions of the mass are reduced to smaller and smaller sizes, so that air may reach all parts of the material and a product of finely divided character obtained. It appears that while comparatively little air may actually pass through the material at first, the oxygen dissolved in the water supplies the needs of the aerobic bacteria. As the treatment of the mass continues, more and more of it is exposed to free oxygen. Suitable means may be employed, if desired, for mechanically breaking up the material from time to time, or it may be dropped on spaced iron bars or similar contrivance. However, I have found that the apparatus described is particularly suited to producing good results. Furthermore, by means of the traveling foraminous screens, not only is it possible to distribute the material in a more or less even layer for being acted upon uniformly by air, but the need for means which would tend to compress or compact the material in advancing the same is avoided. In this manner, the porous condition of the material is not adversely affected in transferring the material from one screen to the next, and in fact, the small drop by gravity onto the lower screen may even tend to break up the material somewhat as it strikes.

The bacteria which I have found it preferable to employ in carrying out the present process, for instance in a machine of the character described, are oxidizing aerobic and/or facultative aerobic bacteria which preferably include not only types ordinarily present in the material but certain other bacteria capable of causing the material to be decomposed and/or stabilized. Where the material to be stabilized and/or decomposed is sewage, I have found that the following types of bacteria give highly advantageous results. For example, I prefer to employ thermophilic bacteria such as bacillus thermoamylolyticus Coolhaas, bacillus thermocellulolyticus Coolhaas, thermophile #121, and bacillus thermodiastaticus Bergey, which are particularly advantageous in causing the generation of heat in the reacting mass. Also, it is desirable to employ bacteria such as rhizobium leguminosarum Frank, rhizobium trifolii Dangeard, rhizobium phaseoli Dangeard, rhizobium melilote Dangeard, rhizobium radicicoli Beijerinck, rhizobium japonicum Kirchner, azobacter chroococcus Beijerinck, azotobacter vinelandi Lipman, azobacter Beijerinck, Lipman, azotobacter woodstownii Lipman, and nitrobacter winogradskyi Buchanan. These bacteria appear to aid in fixing nitrogen as well as what may be termed a nitrifying action. Other bacteria such as thiobacillus thioparus Beijerinck, thiobacillus denitrificans Beijerinck, and thiobacillus thiooxidans Waksman and Joffe, are preferably employed and appear to have the effect of aiding in the decomposition and/or stabilization of sulphur compounds. Certain bacteria such as cellulomonas liquata Bergey, actinomyces cellulosae Krainsky, aspergillus Japonicus, spirochaeta cytophaga, actinomyces diastaticus Krainsky, aspergillus fumigatus Fresenius and bacillus cellulosae dissolvens are also desirably employed and appear to aid in the decomposition of cellulose compounds. In addition, I prefer to employ bacteria such as protominobacter alboflavum (a, b, c, and d) den Dooren de Jong, protominobacter rubrum den Dooren de Jong, bacillus nondiastaticus Bergey, bacillus lobatus Bergey and bacillus tostus Blau, which appear to be capable of aiding conversion of protein and fatty materials to the desired condition. Moreover, certain bacteria appear to function best in the presence of catalytic or symbiotic substances which are now regarded as enzymes of the endocellular or secretory types. Hence, while I have employed the term bacteria I do not intend to exclude the employment of catalytic or symbiotic substances. Cultures of these bacteria may be purchased in some instances, or prepared from known sources in a manner well understood by bacteriologists. For instance, certain of them may be isolated from various materials, and cultivated in suitable culture mediums, to promote the growth of virile bacteria. While there is no intention of limiting the invention to any specific number or types of bacteria, I have found that excellent results may be secured in decomposing or stabilizing sewage, when a mixture of bacteria of the character set forth is employed. Good results have been obtained with garbage, employing the same types of bacteria.

In preparing a mass of material for stabilization and/or decomposition according to the present invention, it is desirable that the added bacteria be uniformly and thoroughly distributed throughout the mass. As concentrated cultures of bacteria are relatively minute as compared to the mass of sewage, it is very difficult to secure good mixing if they be directly incorporated in the mass. I have found that superior results may be obtained if the cultures are first intimately mixed with finely divided humus or the like. Material which has previously been decomposed in accordance with the present process may advantageously be used. Such material which is low in water content as compared to the sewage may be screened to remove coarse pieces and lumps, and air dried if desired. Lime, preferably slaked, may be added in order to adjust the alkalinity of the material, a pH value of around 8.2 being desirable. Other ingredients, such as iron and aluminum sulphates, wood ashes (for their potash), sulphur (in the form of flowers of sulphur), and small amounts of molasses and beef extracts (to promote the growth of bacteria) may be added if desired. The mix may then be added to about one to three times as much good garden soil, and then thoroughly intermingled with the cultures of bacteria, and allowed to stand till the temperature of the center of the mass rises to around 100° F. and returns to normal. This should require about three days, during which time the mass may be turned once or twice.

The bactage, or inoculating media containing micro-organisms, thus prepared may again be adjusted to an alkaline pH value of 8.2 and mixed with a sulphate such as calcium sulphate, for fixing ammonia which may be generated during the decomposition of organic matter, and is then ready for mixing, for instance in a centrifuge, with sewage or the like in sufficient quantities to produce a mass which preferably has a water content of, say, 50–65%. If desired, the water content of the sewage may be reduced somewhat, say to 70–85% in a preliminary operation, in any convenient manner.

The mass containing a concentrate or abundance of virile aerobic and/or facultative aerobic bacteria, as compared to the natural material, and prepared according to the steps outlined, or otherwise, may then be introduced through the top of the housing onto the foraminous support 16, for instance in a layer about a foot deep. After it has remained thereon for a suitable period, say twenty four hours, while air is passed through it, the endless belt support may be moved to cause the material to drop to the next similar support, whose upper surface is being moved at the same time in the opposite direction. During the reaction the temperature of the material should rise to about 120–150° F. and may sometimes rise even higher, due to the heat of reaction, probably fostered especially by the added thermophilic bacteria. Where the entering air is cold, it may be warmed, say, to 75–80° F. by means of a heater, or by hot water in suitable pipes, as mentioned. The aeration may be repeated a sufficient number of times to obtain a finely divided and substantially completely decomposed or stabilized material suitable for the purpose mentioned. This result may generally be accomplished in about a week's time. The material which has been decomposed can then be dumped from screen 21 through passage 22 to any suitable container. It will be understood that after each batch of material has been dropped to a lower screen, another batch may be placed on the upper screen through trap door 23.

As the material is treated in the manner indicated, it will be understood that the water content of the same is reduced, not only through certain amount of dropping from the foraminous screens, but also due to the evaporation of the moisture by reason of the air passing through the material, and the heat developed. Thus, the amount of material which is transferred from any given screen to the next will be less than the amount originally on the former screen. Thus, it may be desirable to work the screens in any desired sequence or combination in order to adjust the amount of material on each screen as desired. For instance, if the depth of material on the screen 16 is about nine to twelve inches, the amount of material transferred to the next screen may be considerably less, and accordingly certain additional amounts of material may be added to the screen 16 and immediately transferred to the screen 17, by operating the screens independently of one or the other. Furthermore, additional doors might be provided for introducing material direct to any screen below the top screen. Hence, the invention is not limited to any particular sequence of operations of the screens. For instance, it may be desirable to treat several batches of material on one or more of the screens, and transfer all the batches to another screen before discharging material from the latter. The operating mechanism may be varied accordingly.

I have thus provided for the stabilization and/or decomposition of organic material in a highly efficient manner. Moreover, I have not only provided for the disposal of material which would ordinarily be waste and constitute a nuisance, in an improved manner, but at the same time have provided for converting such material to a relatively stable and decomposed condition, as well as to a sufficiently dry and finely divided form, in which it is highly advantageous as a fertilizing material, and in which it is adapted to be added to sewage to produce a mixture to be centrifuged prior to a succeeding decomposition. Furthermore, by conducting the reaction in the manner described, not only are the decomposition of the material and evaporation of moisture hastened, but growth of harmful pathogenic organisms is avoided, while putrid odors are negligible. Also, it appears that by employing an excess of virile, aerobic bacteria, the activity of anaerobic bacteria ordinarily present in the material is suppressed to such an extent that putrefaction is practically negligible.

The invention is not confined to the treatment of sewage and garbage as other organic materials may be treated in a similar manner. Moreover, the sewage, or the like, employed may have been previously partly decomposed. For example, sewage sludge from existing disposal plants may be successfully stabilized according to this invention.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

I claim:

1. Process of decomposing sewage material, which comprises adding to the sewage material decomposed organic material and aerobic bacteria, positioning the mass on a foraminous support, passing a current of air through the mass, transferring the mass to another foraminous support, and passing a separate current of air through the mass.

2. Process of decomposing sewage material, which comprises adding to the sewage material decomposed organic material and organisms including aerobic bacteria, spreading the mass over a foraminous support, passing a current of air through the mass for a period of time in the order of twenty-four hours, transferring the mass to another foraminous support, and passing a separate current of air through the mass for a similar period.

3. Apparatus for treating decomposable organic material comprising a housing, a foraminous member therein adapted to support such material, means to cause said member to dump the material, another foraminous member adapted to receive said material, and means to direct separate streams of fresh air through the members.

4. Apparatus for treating decomposable organic material comprising a housing, a plurality of foraminous members of the endless-belt type adapted to support such material and spaced vertically from one another, means to cause a separate stream of fresh air to pass through each of said members and material, and means for effecting discharge of said material from one of said members to the other.

5. Apparatus for treating decomposable organic material comprising a housing, a plurality of foraminous members of the endless-belt type adapted to support such material and spaced vertically from one another, means including partitions interposed between said members for causing a separate stream of air to pass through each of said members and material, and means for effecting discharge of said material from one of said members to the other.

6. Process of decomposing and/or stabilizing moist organic material, which comprises incorporating in the material bacterial organisms, aerating the mass in such a manner as to inhibit putrefaction and while engendering in it a porous condition to produce a finely divided material, incorporating in the finely divided material bacterial organisms, incorporating the mass thus produced in sewage material, centrifuging to separate the water therefrom, and aerating the mass thus produced in such a manner as to inhibit putrefaction and while engendering in it a porous condition.

7. Process of decomposing and/or stabilizing organic material, comprising incorporating in the material virile organisms capable of promoting aerobic or oxidizing reactions, said material having a water content which is less than 60% and being of such consistency as to permit a draft of air to pass therethrough, promoting oxidation by causing adequate amounts of air to pass through foraminous members and through the material, maintained in a compartment at a temperature suitable for promoting bacterial reactions and for producing active organisms in the end material, disturbing the material undergoing reaction to break up lumps, continuing the foregoing process until a finely divided end material of relatively low moisture content is secured, and adding a portion of said finely divided end material to organic material to be decomposed.

8. Process of decomposing and/or stabilizing sewage material, comprising incorporating in the material virile organisms capable of promoting aerobic or oxidizing reactions, said material having a water content which is less than 60% and being of such consistency as to permit a draft of air to pass therethrough, promoting oxidation by causing adequate amounts of air to pass through foraminous members and through the material, maintained in a compartment at a temperature suitable for promoting bacterial reactions and for producing active organisms in the end material, disturbing the material undergoing reaction to break up lumps, continuing the foregoing process until a finely divided end material of relatively low moisture content is secured, and intimately intermingling a portion of said finely divided material with raw sewage material.

9. Process of decomposing and/or stabilizing sewage material, comprising incorporating in the material virile organisms capable of promoting aerobic or oxidizing reactions, said material having a water content which is less than 60% and being of such consistency as to permit a draft of air to pass therethrough, promoting oxidation by causing adequate amounts of air to pass through foraminous members and through the material, maintained in a compartment at a temperature suitable for promoting bacterial reactions and for producing active organisms in the end material, disturbing the material undergoing reaction to break up lumps, continuing the foregoing process until a finely divided end material of relatively low moisture content is secured, and centrifuging a portion of said finely divided material with said sewage material.

10. Process of decomposing and/or stabilizing organic material, comprising incorporating in the material virile bacterial organisms capable of functioning in the presence of free oxygen and passing air, in such quantity and under such conditions as to promote early and rapid oxidation and to inhibit putrefaction, through the material initially free from excessive moisture while engendering in the material a porous condition and maintaining it at a temperature suitable for fostering organic activity, and subsequently using the product thus produced in the further treatment of decomposable organic material before dewatering the same.

11. A process for decomposing and/or stabilizing sewage sludge, comprising converting a portion of the same to a fine granular state, adding such portion to the sewage sludge before dewatering, and thereafter dewatering the sewage sludge and exposing the dewatered mass to oxygen and breaking up the mass sufficiently often to inhibit putrefaction, and finally to reduce the mass to a stabilized, substantially dry and finely divided condition.

12. A process for decomposing and/or stabilizing sewage sludge, comprising exposing a portion of the sewage sludge to oxygen and breaking up the mass sufficiently often to inhibit putrefaction, and finally to reduce the mass to a stabilized, substantially dry and finely divided condition, adding such material to the sewage sludge before dewatering, dewatering the sewage sludge and exposing the sewage solids to oxygen while breaking up the mass sufficiently often to inhibit putrefaction, and finally to reduce the mass to a stabilized, substantially dry and finely divided condition.

13. Process of decomposing and/or stabilizing organic material, comprising incorporating in the material virile bacterial organisms capable of functioning in the presence of free oxygen and passing air, in such quantity and under such conditions as to promote early and rapid oxidation and to inhibit putrefaction, through the material initially free from excessive moisture while engendering in the material a porous condition and maintaining it at a temperature suitable for fostering micro-organic activity, and subsequently adding the product thus produced to unstabilized organic material and dewatering the same by centrifuging.

14. A process for decomposing and/or stabilizing sewage sludge, comprising converting a portion of the same to a fine granular state, adding such portion to the sewage sludge before dewatering, and thereafter centrifuging the sewage sludge to dewater the same, exposing the dewatered mass to oxygen and breaking up the mass sufficiently often to inhibit putrefaction, and to reduce the mass to a stabilized, substantially dry and finely divided condition.

15. A process for decomposing and/or stabilizing sewage sludge, comprising exposing a portion of the sewage sludge to oxygen and breaking up the mass sufficiently often to inhibit putrefaction, and to reduce the mass to a stabilized, substantially dry and finely divided condition, adding a portion of such material to the sewage sludge before dewatering, centrifuging the sewage sludge to dewater the same, and exposing the sewage solids to oxygen while breaking up the mass sufficiently often to inhibit putrefaction, and to reduce the mass to a stabilized substantially dry and finely divided condition.

16. Process for decomposing and/or stabilizing organic material, comprising passing air, in such quantities and under such conditions as to promote early and rapid oxidation and to inhibit putrefaction, through organic material containing virile bacterial organisms capable of functioning in the presence of oxygen, said material being initially free from excessive moisture while engendering in the material a porous condition and maintaining it at a temperature suitable for fostering micro-organic activity, and subsequently adding the product thus produced to unstabilized organic material and dewatering the same.

GEORGE H. ROEDER.